(12) United States Patent
Vatanen

(10) Patent No.: US 6,237,093 B1
(45) Date of Patent: May 22, 2001

(54) PROCEDURE FOR SETTING UP A SECURE SERVICE CONNECTION IN A TELECOMMUNICATION SYSTEM

(75) Inventor: Harri Vatanen, Windsor (GB)

(73) Assignee: Sonera Oyj, Helsinki (FI)

(*) Notice: Subject to any disclaimer, the term of this patent is extended or adjusted under 35 U.S.C. 154(b) by 0 days.

(21) Appl. No.: 09/474,409

(22) Filed: Dec. 29, 1999

Related U.S. Application Data

(63) Continuation of application No. PCT/FI98/00532, filed on Jun. 18, 1998.

(30) Foreign Application Priority Data

Jun. 30, 1997 (FI) ........................................ 972819

(51) Int. Cl.⁷ .................................................. G06F 1/24
(52) U.S. Cl. ..................... 713/162; 713/168; 713/182; 380/255
(58) Field of Search ............................ 380/255; 713/150, 713/153, 161, 162, 168, 182

(56) References Cited

U.S. PATENT DOCUMENTS

| 4,706,275 | 11/1987 | Kamil . |
| 5,598,536 | 1/1997 | Slaughter, III et al. . |
| 6,061,795 | * 5/2000 | Dircks et al. ..................... 713/201 |
| 6,061,796 | * 5/2000 | Chen et al. ........................ 713/201 |
| 6,064,736 | * 5/2000 | Davis et al. ........................ 380/21 |
| 6,073,176 | * 6/2000 | Baindur et al. .................... 709/227 |

FOREIGN PATENT DOCUMENTS

| 2161983 | 5/1997 | (CA) . |
| 0801479 A1 | 10/1997 | (EP) . |
| WO 94/11849 | 5/1994 | (WO) . |
| WO 97/01920 | 1/1997 | (WO) . |
| WO 97/03410 | 1/1997 | (WO) . |
| WO 97/50235 | 12/1997 | (WO) . |
| WO 98/06199 | 2/1998 | (WO) . |

OTHER PUBLICATIONS

The GSM System for Mobile Communications, Mouly and Pautet, 1992 pp. 70–71.

* cited by examiner

Primary Examiner—Thomas R. Peeso
(74) Attorney, Agent, or Firm—Cohen, Pontani, Lieberman & Pavane

(57) ABSTRACT

A procedure for setting up a secure service connection in a communication system which includes a first telecommunication network, a first terminal device connected to the first telecommunication network, a second telecommunication network, a second terminal device connected to the second telecommunication network, and a telecommunication server. The first terminal device is connected via a first telecommunication connection to the telecommunication server and the second terminal device is connected to the telecommunication server via a second telecommunication connection. The unique identifying address of the first terminal device and the data needed to verify that the first terminal device is permitted access to the services of the telecommunication server are transmitted to the telecommunication server via the second terminal device and second telecommunication connection, and the data sent by the second terminal device are verified at the telecommunication server. If the first terminal device is determined to have the required right of access to the services of the telecommunication server, the first telecommunication connection from the telecommunication server to the first terminal device is set up based on the successful verification and using the address data received by the telecommunication server.

10 Claims, 1 Drawing Sheet

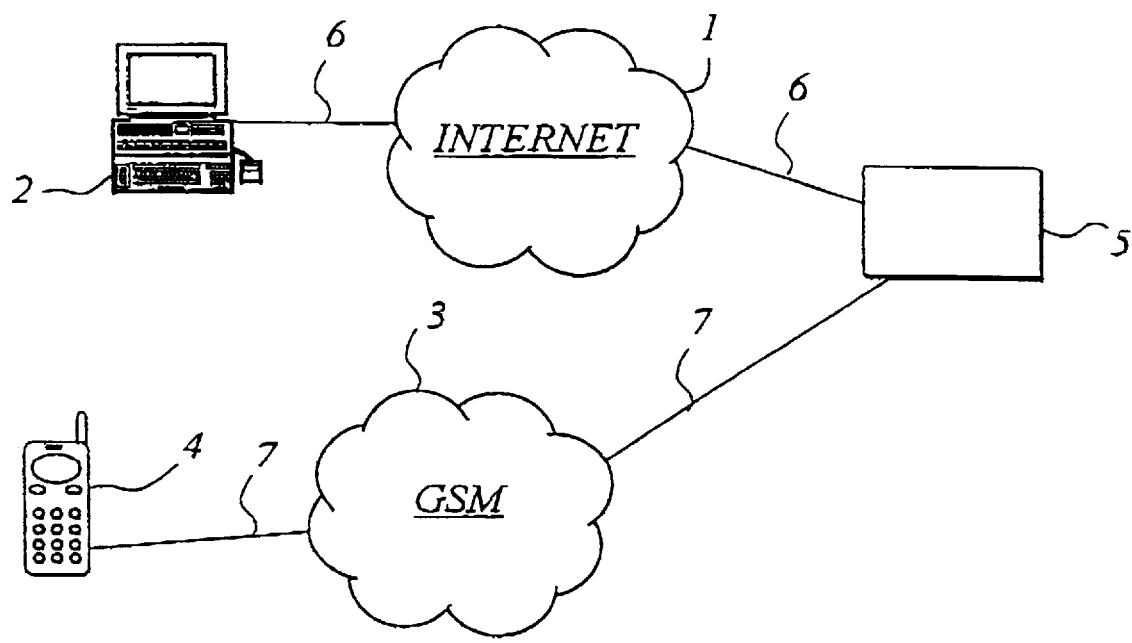

PROCEDURE FOR SETTING UP A SECURE SERVICE CONNECTION IN A TELECOMMUNICATION SYSTEM

This application is a continuation of PCT/FI98/00532, filed Jun. 18, 1998.

BACKGROUND OF THE INVENTION

1. Field of the Invention

The present invention relates to a procedure for setting up a secure service connection in a telecommunication system which may, for example, comprise the Internet and a wired telephone network or mobile wireless communication network.

2. Description of the Related Art

The global data network, i.e. the Internet, is based on an open structure that can be joined by practically anyone. Each device present or included in or connected to the network has a unique, individual name, referred to as an Internet name. The data link protocol used for communication over the Internet is TCP/IP (Transmission Control Protocol/Internet Protocol), in which TCP corresponds to OSI (Open System Interconnection architecture) layer 4 and IP corresponds to OSI layer 3. OSI is a standard that defines the manner in which systems can be openly interconnected. In the OSI model, telecommunication software is divided into sections called layers. The basic principle of this model is that the functions of the layers have been defined but the manner of their implementation has been left open. For each layer, a specific interface has been defined, through which that layer communicates with the layers above and below it. The functions of a layer and those of the layers below it are called services.

A common problem restricting the use of the Internet is that the security of certain network layers consistent with the OSI model has not been standardized or otherwise defined. Therefore, a connection set up via the Internet between two computers or equivalent terminals is unprotected, which means that in principle anyone who is connected to the network can receive and read messages sent between the two computers. Correspondingly, anyone can send messages intended for someone else via a connection between two computers and thus disturb or otherwise impair the security and privacy of users. For example, the secure placing of orders and making of payments for services sold via the Internet is difficult. Likewise, reliable user identification and connection setup are difficult and require special arrangements.

In both wired telephone networks and mobile communication networks, advanced methods for encrypting a telecommunication connection, or at least the data transmitted over the connection, are commonly used. The encryption of radio communication can be regarded as providing a very high level of security, particularly in a mobile or wireless communication network such as a GSM network. Moreover, the GSM network standard allows the transmission of SMS or ESMS messages, so that the information to be encrypted can be enciphered into the message at the transmitting end and deciphered at the receiving end. Such an arrangement provides a very high level of data security. Patent specification WO 94/11849 discloses a mobile communication system in which the user of the system is authenticated locally, whereupon a secure connection is set up to a service provider or a telecommunication server. However, one problem in selling and offering services via a telephone-based network or a mobile communication network is that the service provider has no way to, for example, graphically present or represent the services or products being offered or sold. In addition, the use or ordering of services via a terminal in a telephone network or a mobile communication network, i.e. by wired or wireless telephone, is difficult.

OBJECTS AND SUMMARY OF THE INVENTION

It is accordingly the desideratum of the present invention to eliminate and overcome the aforedescribed problems.

A specific object of the invention is to provide a new type of procedure, in a telecommunication system comprising both a telephone network and a data network, to allow reliable user identification and provide a handy and easy way for the user to order services offered by the network.

A further object of the invention is to provide a procedure by which the user can use or order products and/or services provided via the Internet regardless of the user's location and the nature of the user's terminal device or computer that is connected to the Internet.

These and other objects and features of the invention are implemented in a procedure for setting up a secure service connection in a telecommunication system comprising a first telecommunication network, preferably a data network such as the Internet; a first terminal device, preferably a computer or the like connected to the first telecommunication network; a second telecommunication network, preferably a wired or wireless telephone network and/or mobile communication network; a second terminal device, preferably a telephone or mobile station connected to the second telecommunication network; and a telecommunication server communicating with both the first and second telecommunication networks, the first terminal device being connectable via a first telecommunication connection to the telecommunication server and the second terminal device being connectable to the telecommunication server via a second telecommunication connection.

In accordance with the invention, the unique address of a computer in a data network (such as the Internet), as well as the data needed for verification of information giving the computer access to the services of the telecommunication server, such as the user identifier and password, are transmitted via a telephone or mobile station (i.e. the second terminal device) using the second telecommunication connection. The data thus sent are verified or authenticated at the telecommunication server and, if the first terminal device or its user is determined to have the required right of access to the services of the telecommunication server, a first telecommunication connection from the telecommunication server to the first terminal device is set up based on the verification and the address data received. The access right may also involve or comprise transfer or acknowledgement of a predetermined sum of money, or of an alternate compensation or consideration, that is used to purchase service time at the telecommunication server, or the access right may comprise or consist of a command to open a connection, in which case the command to close the connection is subsequently sent in a corresponding manner via the telephone or mobile station. The unique address may for example be the IP address or the domain name of the computer.

As compared with prior art, the present invention advantageously makes it easy to verify the Internet user's right of access to services offered in the network and to pay for the services and products sold via the Internet. A Further advantage over the prior art is that the user is not tied to a given computer or other corresponding data network terminal because the particular IP address from which the user is currently accessing the network is specified each time that a connection is set up.

In an embodiment of the present invention, the second telecommunication connection to be established via a telephone network is set up as a secure connection in which all data transmitted via the second connection is encrypted using a predetermined encrypting algorithm. Correspondingly, the data transmitted is decrypted in or at the telecommunication server and the data to be transmitted to the telephone is encrypted. Alternatively, the second telecommunication connection may be a message switching connection, preferably an ESMS connection, in which case the connection is used to transmit encrypted message packets containing the above-described address data and access right verification data.

In the same or another embodiment of the invention, a check is periodically carried out at or by the telecommunication server to establish whether the first and/or the second telecommunication connection is active and whether the user has a right of access to the services provided via the telecommunication server. In this case, the payments for the service and connection may be charged based on the duration of the connection.

In accordance with another embodiment of the invention, a fixed payment for a service is sent by telephone to the telecommunication server using, for example, known chargeable service number applications, and the first telecommunication connection is then disconnected upon expiration of the service time corresponding to the amount or character of the payment.

In one particular embodiment of the invention, both the first and second connections are used in real time to purchase a product or service via the Internet by sending a purchase order via the first telecommunication connection and the computer, and reserving the purchase price on the user's account via the second telecommunication connection and the telephone. The telecommunication server is then informed of the reservation of the purchase price and, when the user receives the product or service and accepts it, the transaction is acknowledged by telephone whereupon the reserved sum is transferred to the seller.

Other objects and features of the present invention will become apparent from the following detailed description considered in conjunction with the accompanying drawing. It is to be understood, however, that the drawing is designed solely for purposes of illustration and not as a definition of the limits of the invention, for which reference should be made to the appended claims. It should be further understood that the drawing is not necessarily drawn to scale and that, unless otherwise indicated, it is merely intended to conceptually illustrate the structures and procedures described herein.

BRIEF DESCRIPTION OF THE DRAWING

The drawing diagrammatically depicts a telecommunication system in which the inventive process may be implemented and practiced.

DETAILED DESCRIPTION OF THE PRESENTLY PREFERRED EMBODIMENTS

The telecommunication system shown by way of example in the drawing is formed of the Internet 1 and a GSM telephone network 3. A computer 2 is connected to the Internet 1, and a mobile station 4—such as a mobile telephone handset—is connected to the GSM network 3. The service provider's telecommunication server 5 is connected to both the Internet and the GSM network, and the computer 2 is connectable to the telecommunication server via a telecommunication connection 6 over the Internet while the mobile station 4 is connectable to the telecommunication server via a telecommunication connection 7 over the GSM network.

It should of course be understood and appreciated that the particular networks and terminal devices described and presented herein are provided solely by way of illustrative example and for ease of description, and that other devices and networks can also or alternatively be used in the implementation and practice of the procedure of the invention.

The basic idea of the invention is that an open network, such as the Internet 1, may be used as a marketing and service channel in which products and services are presented and provided, and through which payments for desired products and services may be made using a telephone or the like via a separate telecommunication connection 7.

The Internet user, for whom a unique IP address has been defined in accordance with conventional practice, sets up a connection to the telecommunication server 5 from the user's computer after the user has either transmitted from the user's mobile station 4 a payment message, e.g. an ESMS message containing the user's user identifier encrypted in the data field in a known manner, or set up an encrypted circuit-switched connection 7 to the telecommunication server 5 and transmitted the user's user identifier to the server 5 via the connection 7. In or at the telecommunication server 5, the received message is decrypted and the first telecommunication connection 6 is related to the user's account or to another record associated with that user. At periodic intervals, the telecommunication server 5 checks whether one or both of the telecommunication connections 6, 7 are active and maintains call duration counters based on the results of these checks.

The payments for chargeable services offered via the Internet may, by way of example and in accordance with an embodiment of the invention, be charged as follows. Using a service-specific counter in the telecommunication server, by which the customer is charged for example on the basis of duration of connection, the customer sends or authorizes the transfer of a fixed sum, which is stored in the counter. The counter is started when the first telecommunication connection 6 in the open network is set up and, when the counter detects that the stored fix sum has been exhausted (by virtue of the passage of an appropriate period of time), the first telecommunication connection 6 is terminated or disconnected. The customer is then billed for this fixed sum.

In an alternative implementation, the connection time is paid for via continuous time charging, in which case the server maintains a service specific counter that increases, based on the connection time, the sum to be charged until the user sends the server 5 a request to terminate or disconnect the first telecommunication connection 6. The customer is then billed for the sum indicated by the counter. A request from the user to cancel or terminate the service is sent via the second telecommunication connection 7.

In a third implementation, the product or service is presented to the customer via the first telecommunication connection 6 and, after the customer has decided to purchase the product or service, the user uses the second telecommunication connection 7 to pay for the product or service. Based on that payment, the product or service is delivered to the customer.

In a still further modification, the product or service is paid for via a mobile station. Using the mobile telephone 4 and the second telecommunication connection 7 in any of the various ways described above, or in any other appropriate manner in accordance with the invention, the user or customer reserves a given sum on the user's account, and the service provider is notified of the reserved sum via the telecommunication server 5. Based on this notification, the service provider then delivers the product or service to the customer and the customer will acknowledge receipt of the product or service after accepting its delivery. Those skilled in the art will understand and appreciate that in each of the aforedescribed implementations and embodiments, the current state or status of the payment can be displayed and dynamically updated for the customer in real time using the first telecommunication connection 6 and the computer 2.

While there have shown and described and pointed out fundamental novel features of the invention as applied to preferred embodiments thereof, it will be understood that various omissions and substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A procedure for setting up a secure service connection in a telecommunication a system that comprises a first telecommunication network (1), a first terminal device (2) connected to the first telecommunication network, a second telecommunication network (3), a second terminal device (4) connected to the second telecommunication network, and a telecommunication server (5) operable to selectively establish and terminate a first telecommunication connection (6) between the first terminal device (2) and the telecommunication server, comprising the steps of:

establishing a second telecommunication connection (7) between the second terminal device (3) and the telecommunication server (5);

transmitting to the telecommunication server (5), via the second terminal device (4) and the second telecommunication connection (7), a unique identifying address of the first terminal device (2) and data permitting verification by the telecommunication server as to whether the first terminal device (2) is permitted access to a service provided by the telecommunication server (5);

verifying, at the telecommunication server (5), the data sent to the telecommunication server via the second terminal device (4) and the second telecommunication connection (7) to determine whether the first terminal device (2) is permitted access to the service provided by the telecommunication server; and establishing, where said verifying step determines that the first terminal device (2) is permitted access to the service, the first telecommunication connection (6) between the first terminal device (3) and the telecommunication server (5) using the unique identifying address of the first terminal device (2) received by the telecommunication server (5) from the second terminal device.

2. A procedure in accordance with claim 1, wherein said step of establishing a second telecommunication connection (7) comprises setting up a secure telecommunication connection between the second terminal device (4) and the telecommunication server (5) by encrypting data transmitted via the secure telecommunication connection using a predetermined encrypting algorithm.

3. A procedure in accordance with claim 1, wherein said step of establishing a second telecommunication connection (7) comprises setting up a message switching connection between the second terminal device (4) and the telecommunication server (5) for use in transmitting encrypted message packets via the message switching connection.

4. A procedure in accordance with claim 3, wherein the message switching connection is set up for transmitting one of SMS and ESMS messages in accordance with a GSM standard.

5. A procedure in accordance with claim 1, further comprising the step of periodically carrying out, at the telecommunication server (5), a check to determine whether each of the first and the second telecommunication connections (6, 7) is active.

6. A procedure in accordance with claim 1, further comprising the steps of:

measuring, at the telecommunication server (5), a time duration of the first telecommunication connection (6) between the first terminal device (2) and the telecommunication server; and charging a user of the second terminal device (3) for the service based on the measured time duration of the first telecommunication connection.

7. A procedure in accordance with claim 1, further comprising the steps of:

transmitting, from the second terminal device (4) via the second telecommunication connection (7), a fixed payment for the service; and terminating, by the telecommunication server (5), the first telecommunication connection (6) upon expiration of a time duration for providing the service via the first telecommunication connection in accordance with the fixed payment.

8. A procedure in accordance with claim 1, further comprising the steps of:

transmitting, via the first terminal device (2) and the first telecommunication connection (6), a purchase order for a transaction, including a purchase price, from a user of the first terminal device (2);

reserving via the second terminal device (4) and the second telecommunication connection (7), on an account of the user, the transmitted purchase price;

informing the telecommunication server (5) of the reservation; and acknowledging by the user, via the second telecommunication connection (7), the transaction.

9. A procedure in accordance with claim 1, wherein the first telecommunication network (1) comprises a data network, and the first terminal device (2) comprises means for connecting a user-accessible device to the data network.

10. A procedure in accordance with claim 1, wherein the second telecommunication network (3) is one of a telephone network and a mobile communication network, and the second terminal device (4) is a communication device compatible with the one of a telephone network and a mobile communication network.

* * * * *